(12) United States Patent
Nanjundaiah et al.

(10) Patent No.: US 9,277,050 B2
(45) Date of Patent: Mar. 1, 2016

(54) METHOD AND SYSTEM FOR UPDATING SOCIAL NETWORKING SITE WITH RING BACK TONE INFORMATION

(75) Inventors: Vinay Nanjundaiah, Bangalore (IN); Abhinav Anand, Darbhnaga (IN); Harish Babu, Bangalore (IN); Rohith Koranapalli Nagaraju, Bangalore (IN); Anchal Ramgopal Jajodia, Bangalore (IN); Venkatesh Sreekar, Guntakal (IN); Alapan Kundu, Midnapore (IN)

(73) Assignee: ONMOBILE GLOBAL LIMITED, Bangalore (IN)

( * ) Notice: Subject to any disclaimer, the term of this patent is extended or adjusted under 35 U.S.C. 154(b) by 792 days.

(21) Appl. No.: 12/616,895

(22) Filed: Nov. 12, 2009

(65) Prior Publication Data

US 2010/0255812 A1 Oct. 7, 2010

(30) Foreign Application Priority Data

Nov. 11, 2008 (IN) ............................ 2762/CHE/2008

(51) Int. Cl.
*G06F 15/16* (2006.01)
*H04M 3/42* (2006.01)

(52) U.S. Cl.
CPC ...... *H04M 3/42161* (2013.01); *H04M 3/42017* (2013.01); *H04M 3/42068* (2013.01); *H04M 3/42374* (2013.01); *H04M 2203/655* (2013.01)

(58) Field of Classification Search
CPC ..................... H04M 3/42017; H04M 3/42161; H04M 3/42068; H04M 3/42374; H04M 2203/655

USPC .................................................. 709/217–219
See application file for complete search history.

(56) References Cited

U.S. PATENT DOCUMENTS

| | | | |
|---|---|---|---|
| 2006/0147021 A1* | 7/2006 | Batni et al. ............... | 379/221.08 |
| 2006/0210033 A1* | 9/2006 | Grech et al. ............... | 379/88.19 |
| 2008/0102883 A1* | 5/2008 | Lee ............................ | 455/550.1 |
| 2008/0167015 A1* | 7/2008 | Vishwanathan et al. ...... | 455/413 |
| 2008/0235592 A1* | 9/2008 | Trauth ......................... | 715/733 |
| 2008/0240389 A1* | 10/2008 | Gaume et al. ............ | 379/142.04 |
| 2009/0083060 A1* | 3/2009 | Sherman et al. .................. | 705/1 |
| 2009/0299963 A1* | 12/2009 | Pippuri ............................. | 707/3 |
| 2010/0049802 A1* | 2/2010 | Raman ......................... | 709/204 |
| 2011/0208616 A1* | 8/2011 | Gorman et al. .............. | 705/27.1 |

* cited by examiner

*Primary Examiner* — Joseph Greene
(74) *Attorney, Agent, or Firm* — Hoffmann & Baron, LLP

(57) ABSTRACT

A method for providing access to a socio-RBT service is provided. The socio-RBT service enables updating social networking website profile of a user with RBT related information of the user. The method enables, firstly, receiving socio-RBT subscription information from the user. The socio-RBT subscription information comprises at least one unique identifier of the user. Secondly, the method enables verifying one or more predetermined conditions related to the user. The one or more predetermined conditions facilitate to determine if the user is eligible to access the socio-RBT service. Further, the method enables mapping the unique identifier of the user with a unique identifier of the user's social networking website profile. The method further enables obtaining RBT subscription information corresponding to the mapped unique identifier of the user. The method enables, finally, updating RBT related information on the social networking website profile of the user corresponding to the RBT subscription information.

9 Claims, 3 Drawing Sheets

METHOD AND SYSTEM FOR UPDATING SOCIAL NETWORKING SITE WITH RING BACK TONE INFORMATION

FIELD OF INVENTION

The present invention relates generally to the field of social networking websites and Ring Back Tone (RBT) services in a telecommunication network. More specifically, the present invention provides a method and system for updating information related to a user on a social networking website using RBT related data/information of the user.

BACKGROUND OF THE INVENTION

With advancements in communication technology, participative websites such as social networking websites are widely used to view user's profile information such as location, interests, hobbies, occupation etc. Further, social networking websites also facilitate users/subscribers to interact with each other. In addition, users/subscribers can also share pictures and send messages through their social networking website profile. Examples of some popular social networking sites may include MySpace, Orkut, Facebook, LinkedIn and Hi5. Over a period of time, these websites have gained popularity as they enable users to connect with existing and old friends, find new people sharing common hobbies and interests, and establish new business contacts etc.

Generally, the user's social networking website profile in a social networking website describes the user's personality traits. Further, the social networking websites provide updates on changes made by a user to the social networking website profile or any recent activity undertaken by the user on the social networking website. However, these updates and activities are limited to the ones carried out by the user when he accesses a particular social networking website using a data communications network, such as, internet.

Conventionally, the only method to update the social networking website profile of a user or undertake any activity is to access the social networking website over the internet. In certain example scenarios, when internet access is not available due to technical fault or may be because the user is in a location where internet connectivity is not provided, the user shall not be able to update his social networking website profile or perform any other activity on a social networking website. Further, if the user is not a regular user of the Internet, his social networking website profile may not be updated with his personality traits which may have changed over a period of time.

Moreover, traditional methods and systems do not provide any means to harness existing telecommunication services, such as, Value Added Services (VAS) for updating the social networking website profile. Various VAS, such as, RBT are indication of user preferences and personality traits. Enough information can be extracted from the RBT to update the social networking website profile of the user. As RBT provided by a telecommunication network is usually a monotonous sound heard by a caller while waiting for a callee to respond to a call, users have an option to select a RBT of their own choice by subscribing to a RBT service. The RBT selected by the user can be used to understand the personality traits of the user and make them available on his social networking website.

In light of the above, there is a need for a system and method for integrating social networking websites with VAS. Further, there is a need for a system and method for integrating social networking website with RBT services. In addition, there is a need for a system and method that would enhance the experience of other users/subscribers browsing through the social networking websites as they would be provided with additional information about a particular user, such as, the user's current emotional state, favorite song etc. compounded with the user's social networking website profile. Furthermore, there is a need for a system and method where the user's social networking website profile can be updated without requirement of Internet access.

BRIEF DESCRIPTION OF THE ACCOMPANYING DRAWINGS

The present invention is described by way of embodiments illustrated in the accompanying drawings wherein.

SUMMARY OF THE INVENTION

Figure 1:
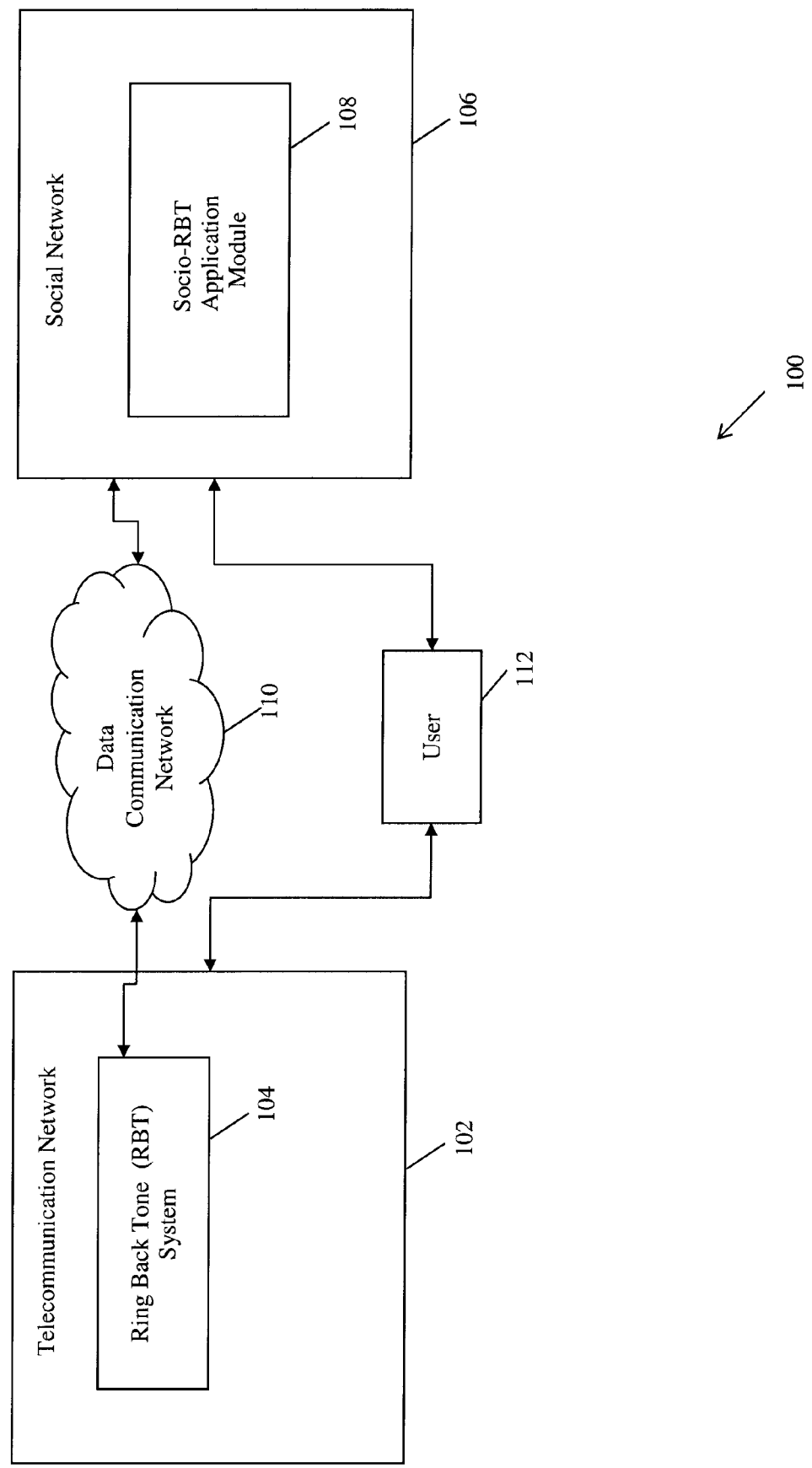
FIG. 1 illustrates a block diagram representing an integrated socio-RBT system in accordance with an embodiment of the present invention.

A method for providing access to a socio-RBT service is provided. The socio-RBT service enables updating social networking website profile of a user with RBT related information of the user. The method comprises, firstly, receiving socio-RBT subscription information from the user. The socio-RBT subscription information comprises at least one unique identifier of the user. Secondly, the method comprises verifying one or more predetermined conditions related to the user. The one or more predetermined conditions facilitate to determine if the user is eligible to access the socio-RBT service. Further, the method comprises mapping the unique identifier of the user with a unique identifier of the user's social networking website profile. The method further comprises obtaining RBT subscription information corresponding to the mapped unique identifier of the user. Finally, the method comprises updating RBT related information on the social networking website profile of the user corresponding to the RBT subscription information.

In another embodiment of the present invention, the method further comprises determining if the user is a RBT subscriber. In an embodiment of the present invention, the method further comprises registering the user to a RBT service in case the user is not a RBT subscriber. In another embodiment of the present invention, the method further comprises facilitating other users of the socio-RBT service to access and copy the RBT related information from the user's social networking website profile. In another embodiment of the present invention, the method further comprises subscribing other users to the socio-RBT service in case the other users are not subscribed to the socio-RBT service.

In an embodiment of the present invention, the unique identifier of the user comprises at least one of: the user's Mobile Station International Subscriber Directory Number (MSISDN) and International Mobile Subscriber Identity (IMSI) number. In another embodiment of the present invention the RBT subscription information comprises at least one of: a unique identifier associated with RBT selected by the user and RBT statistics information. In an embodiment of the present invention, the RBT related information comprises at least one of: RBT selected by user and emoticon and/or emotions based on the RBT selected by the user.

A system for facilitating interworking of social network and a RBT system in a telecommunication network to provide access to a socio-RBT service is provided. The socio-RBT service facilitates updating social networking website profile of user with RBT related information of the user. The system comprises a user interface configured to receive socio-RBT subscription information from the user. The socio-RBT subscription comprises at least one unique identifier of the user. The system further comprises a social network module configured to receive the socio-RBT subscription information from the user interface. Further, the system comprises a mapping unit configured to map the unique identifier of the user with a unique identifier of the social networking website profile of the user. The unique identifier of the social networking profile of the user is retrievable from the social network module. Furthermore, the system comprises a RBT social plug-in module configured to facilitate providing RBT subscription information corresponding to the mapped information in the social network module. The social network module is configured to, thereafter, facilitate updating the social networking website profile of the user with RBT related information corresponding to the RBT subscription information.

In an embodiment of the present invention, the system further comprises a RBT module configured to facilitate bi-directional communication of socio-RBT service information between one or more modules of the social network and one or more modules of the RBT system. The socio-RBT service information comprises RBT subscription information of the user and the socio-RBT subscription information. In another embodiment of the present invention, the system further comprises a RBT subscriber database configured to store RBT subscription information and the socio-RBT subscription information received from the social network module.

In another embodiment of the present invention, the RBT social plug-in module is configured to facilitate bi-directional communication of socio-RBT service information between one or more modules of the RBT system and one or more modules of the social network. In an embodiment of the present invention, the system further comprises a multi Value Added Service (VAS) configured to store socio-RBT service information. The socio-RBT service information comprises RBT subscription information of the user and the socio-RBT subscription information. Further, the multi Value Added Service (VAS) is configured to provide the RBT subscription information to the RBT social plug-in module in case the user's Value Added service (VAS) provider of socio-RBT service is different from the user's VAS provider of RBT service.

In another embodiment of the present invention, the system further comprises a custom implementation module configured to receive socio-RBT subscription information from the user interface and transmit the socio-RBT subscription information to a RBT subscriber database. In an embodiment of the present invention, the system further comprises media-emoticons-emotions mapping module configured to map a unique identifier of the RBT selected by the user with one or more appropriate emoticons and/or emotions. Further, the media-emoticons-emotions mapping module is configured to provide the mapped information to the social network module for updating the social network profile of the user with the one or more appropriate emoticons.

In another embodiment of the present invention, the system further comprises a RBT provisioning module configured to receive socio-RBT subscription information from the user, verify predefined conditions related to the user, transmit the socio-RBT subscription information to the user interface, and authenticate subscription of the user to socio-RBT service. Further, the RBT provisioning module is configured to upload RBT subscription information of the user on the RBT subscriber database in case the user is not a RBT subscriber.

DETAILED DESCRIPTION OF THE INVENTION

A system and method for integrating RBT system in a telecommunication network with social network is provided. The invention provides for a socio-RBT system which facilitates updating social networking website profile of a user in a social networking website with RBT related data/information of the user. The user has a social network profile on a social networking website and is also a subscriber of RBT service (RBT subscriber).

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

FIG. 1 is a block diagram representing an integrated socio-RBT system 100 in accordance with an embodiment of the invention. In various embodiments of the present invention, the socio-RBT system 100 comprises a telecommunication network 102, a social network 106, and a data communication network 110 and a user 112 having access to the telecommunication network 102 and the social network 106.

Telecommunication network 102 is a network of telecommunication links connecting different nodes of the telecommunication network 102. In various embodiments of the present invention, users 112 can communicate with each other or with one or more nodes of the telecommunication network 102 through the telecommunication links. The telecommunication links may include wire or cables such as coaxial or fiber optic cables, wired or wireless telephone, wireless or satellite communications. The users 112 may use telecommunication terminals such as mobile phones, personal digital assistants, wire or wireless telephones (landline) etc. to communicate with each other pursuant to acquiring subscription from a specific Telecommunication Service Provider (TSP) in the telecommunication network 102. TSPs provide standard services such as voice calls and facsimile transmission to the users 112.

The telecommunication network 102 further comprises a Ring Back Tone (RBT) system 104. In an embodiment of the present invention, the RBT system 104 facilitates a caller to hear a ringing tone on a telephone line prior to the call being answered by a callee (in this case user 112) at the receiving end. The ringing tone heard by the caller is referred to as RBT. The RBT is a VAS provided to the user 112 by the TSPs other than the aforementioned standard services to the users 112. The TSPs may provide VASs in collaboration with VAS providers. The user 112 may subscribe to a RBT service to get the ringing tone replaced by a song, an advertisement or even an interactive session with the caller. The RBT of a user 112 may be a customized message comprising a personalized voice message by the user 112 followed by a media file. The RBT system 104 is configured to facilitate integration with the social network 106 and operate in conjunction therewith. Further, the RBT system 104 also facilitates determining if the user 112 accessing the socio-RBT system 100 is subscribed to a RBT service or is not subscribed. Subsequently, the RBT system 104 handles registration of the user 112 to a RBT service.

The social network 106 is a network which facilitates users/subscribers 112 to communicate with each other and share information related to personality traits and preferences of the users 112. In various embodiments of the present invention, various social networking websites such as Orkut, MySpace, Hi5, Facebook, LinkedIn etc. enable users to maintain his social networking website profile. The social networking website profile contains information related to the user's personality traits and preferences. Other users may access social networking website profile of the user 112 to explore the interests and activities of the user 112 and build online communities of users/subscribers who share interests.

The social network 106 further comprises a socio-RBT application module 108. In various embodiments of the present invention, the socio-RBT application module 108 is a program module which facilitates integrating the social network 106 with the RBT system 104 and provides socio-RBT service to the user 112. The socio-RBT application module 108 facilitates updating social networking website profile of the user 112 with RBT related information of the user 112. For example, the RBT related information may include information related to a song which the user 112 has subscribed in place of a ringing tone or status information of the user 112. The socio-RBT application module 108 enables display of the information related to the song and/or status information of the user 112 on the social networking website profile of the user 112. Thus, additional information revealing a facet of the user's 112 personality can be made available in the user's 112 social networking website profile without the user 112 providing it himself by accessing the social networking website over the internet.

The data communication network 110 is a communication medium which facilitates transmission of data/information between nodes in a network or between one or more networks. In various embodiments of the present invention, the data communication network 110 facilitates transmission of data/information between the RBT system 104 and the social network 106 using various communication standards or protocols. Examples of data communication network 110 include internee, Local Area Network (LAN), Wide Area Network (WAN) or any other communication network.

Figure 2:
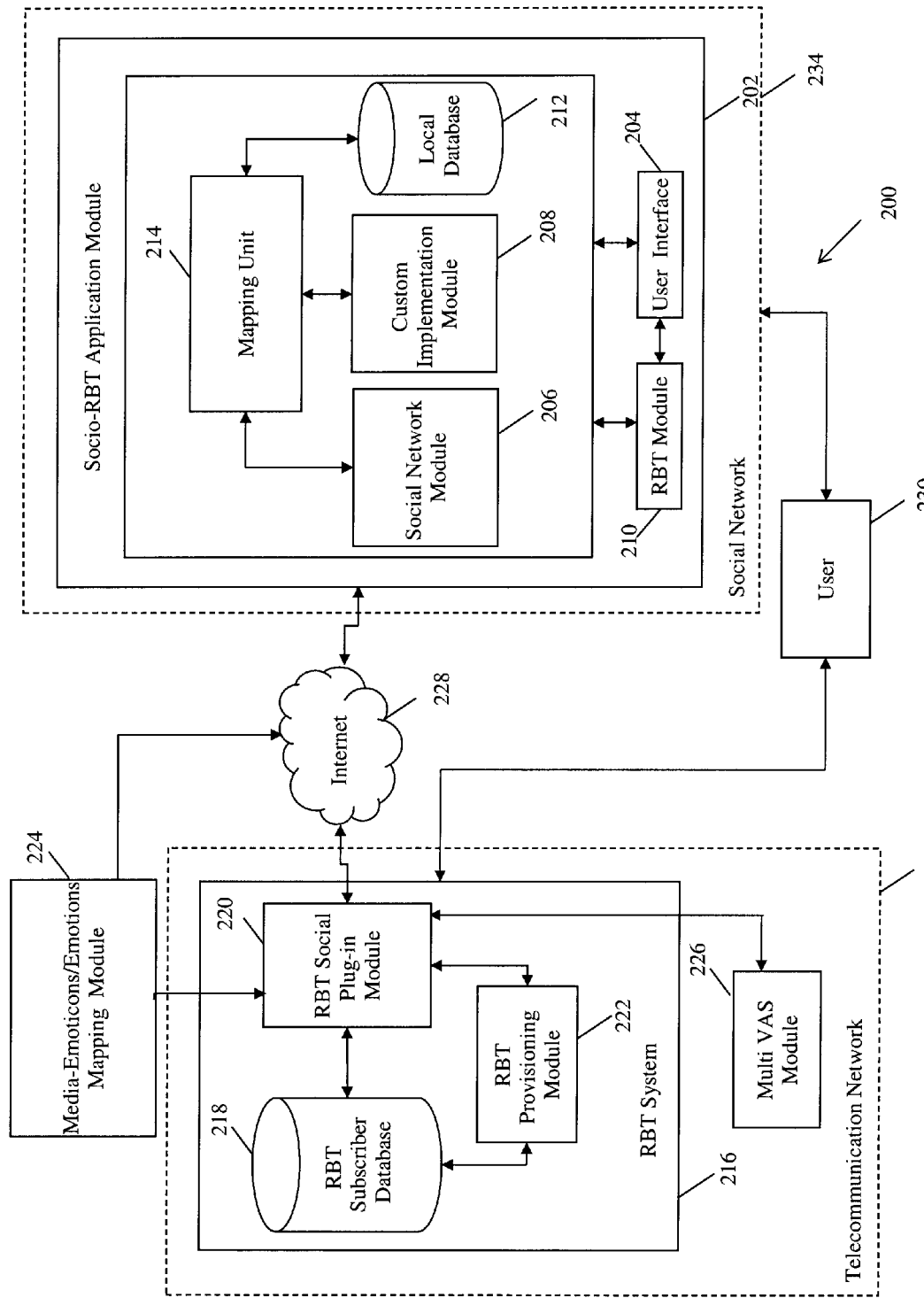
FIG. 2 is a detailed block diagram of the socio-RBT system in accordance with an embodiment of the present invention.

FIG. 2 is a detailed block diagram of the socio-RBT system 200 in accordance with an embodiment of the present invention. In various embodiments of the present invention, the socio-RBT application module 202 comprises a user interface 204, a social network module 206, a custom implementation module 208, a RBT module 210, a local database 212, and a mapping unit 214. The socio-RBT application module 202 resides in the social network 234.

The RBT system 216 comprises a RBT subscriber database 218, RBT-social plug-in module 220, a RBT provisioning module 222, and a media emoticon-emotion mapping module 224. In an embodiment of the present invention, the RBT system 216 is a part of telecommunication network 232 and thus is specific to a TSP. In an embodiment of the present invention, the telecommunication network 232 comprises a multi VAS module 226. In another embodiment of the present invention, data/information is transferred to and fro between the RBT system 216 and the socio-RBT application module 202 via internet 228. User 230 has a social networking website profile in the social network 234.

User interface 204 is a program module that facilitates the user 230 to access/subscribe to a socio-RBT service. In various embodiments of the present invention, the user interface 204 facilitates the user to provide socio-RBT subscription for accessing the socio-RBT service. The socio-RBT subscription information includes, for example, the user attributes and preferences. The user attributes may also include, but without limitation, name, country, Mobile Station International Subscriber Directory Number (MSISDN) and email id of the user 230. The user preferences may include, but without limitation, giving the user 230 an option to provide updates to other users of same or different social networking websites of the socio-RBT service that the user 230 has subscribed.

In various embodiments of the present invention, the user 230 may initiate the request to subscribe/access to the socio-RBT service using a plurality of interfaces including, but not limited to, Short Message Service (SMS), Interactive Voice Response (IVR), filling form on Internet, Wireless Access Protocol (WAP), Unstructured Supplementary Service Data (USSD) etc. In another embodiment of the present invention, the user interface 204 may be accessed by the user 230 from the social networking website profile (e.g. Orkut) of the user 230. The social networking website profile includes information related to the user 230, such as, name, gender, location, education profile, hobbies, and interests in fields like sports, literature and contact details, such as MSISDN.

In an embodiment of the present invention, once the subscription is provided and processed, the socio-RBT service enables display of RBT related information of the user on the social networking website profile of the user. The RBT related information includes RBT selected by the user 230. For example, if the RBT of the user 230 is "I am busy in a meeting". The status "busy" shall be displayed on the social networking website profile of the user 230. In another example, if RBT of the user is a song, the title of the song and an emoticon based on the song shall be displayed on the social networking website profile of the user 230. In yet another example, a color scheme may be used to reflect mood of the user 230 based on the RBT selected. If the RBT is a sad song, the social networking website profile of the user 230 may be colored black/grey to reflect sad mood of the user 230.

In another embodiment of the present invention, when the user 230 makes an access request using the user interface 204, the user interface 204 verifies if the user 230 is eligible to access the socio-RBT service by checking if there is a collaboration between the Telecommunication Service Provider (TSP) of the user, Value Added Service (VAS) provider of the socio-RBT service and VAS provider of RBT service. In a further embodiment of the present invention, the user interface verifies if the user is a RBT subscriber using the RBT subscriber database 218 via the RBT module 210, internet 228, RBT social plug-in module 220 and the RBT provisioning module 222.

In an embodiment of the present invention, the user interface 204 provides the socio-RBT subscription information to the social network module 206.

Social network module 206 is a program module that runs a plurality of web-based social network applications. The web-based social network applications are interoperable with the social networking websites that support the social network module 206. In an embodiment of the present invention, the social network module 206 is a set of standard APIs based on computer programming languages like HTML, JAVASCRIPT, etc. Examples of social networking websites that support social network module 206 may include, but without limitation, Orkut, FaceBook, MySpace, Hi5 and LinkedIn. In various embodiments of the present invention, the social network module 206 receives the socio-RBT subscription information from the user interface 204. The social network module 206 transmits the socio-RBT subscription information to the RBT subscriber database 218 via the RBT module 210, interne 228 and the RBT social plug-in module 220 respectively.

Custom implementation module 208 is a program module that is used to run applications on social networking websites that either do not support the social network module 206 at all or lack one or more functionalities needed by the social network module 206. In various embodiments of the present invention, in case of social networking websites that do not support the social network module 206, the custom implementation module 208 transmits the socio-RBT subscription information of the users 230 received from the user interface 204 to the RBT subscriber database 218 via the RBT module 210, internet 228 and the RBT social plug-in module 220 respectively.

RBT module 210 is an entity that facilitates exchanging data/information between the socio-RBT application module 202 and the RBT system 216. In various embodiments of the present invention, the RBT module 210 is a set of standard Application Programming Interfaces (APIs) which facilitates interworking between the socio-RBT application module 202 and the RBT system 216 by establishing communication between the different modules of the socio-RBT application module 202 and the RBT social plug-in module 220 in the RBT system 216. In an embodiment of the present invention, the RBT module 210 enables to and fro channelization of the socio-RBT subscription information between the different modules of the socio-RBT application module 202 and the RBT social plug-in module 220 via the RBT social plug-in module 220 and the internet 228. In an embodiment of the present invention, the RBT module 210 facilitates to store socio-RBT service information into the local database 212. The socio-RBT service information comprises socio-RBT subscription information and RBT subscription information of the user 230. The RBT subscription information is related to the RBT service subscribed by the user 230.

Local database 212 is an entity that may be configured to store details of the user's 230 socio-RBT subscription information and information related to RBT subscribed by the user 230. In various embodiments of the present invention, the local database 212 stores a local copy of the socio-RBT service information that is stored in the RBT subscriber database 220. In an embodiment of the present invention, the local database 212 receives the socio-RBT service information via the RBT module 210. The relevant socio-RBT service information stored in the local database 212 may be used by the mapping unit 214 for mapping a particular user information with information related to the user's social networking website.

Mapping unit 214 is an entity that maps information related to the user's social network 234 with information related to the user 230 and vice versa. In various embodiments of the present invention, the mapping unit 214 is a program module which retrieves a unique identifier of the user and a unique identifier of the social networking website profile of the user 230 from the social network module 206. Examples of unique identifier may be, the user's MSISDN and International Mobile Subscriber Identity (IMSI) number of the user. Example of unique identifier of the social networking website may be a profile Identification (ID) of the social networking website.

In another embodiment of the present invention, the mapping unit 214 retrieves the MSISDN of the user 230 from the local database 212. The mapping unit 214, then, maps profile ID of the user 230 to his corresponding MSISDN and the user's 230 MSISDN to his corresponding profile ID. In various embodiments of the present invention, the MSISDN is retrieved from the mapping unit 214 to provide an indication of the social networking website profile of the user 230 where the RBT related information is to be displayed.

RBT subscriber database 218 is an entity that may be configured to store socio-RBT service information of the user 230. In various embodiments of the present invention, the socio-RBT service information includes the socio-RBT subscription information i.e. user attributes and preferences that are received from the social network module 206 via the RBT module 210, the internet 228 and the RBT social plug-in module 220. Further, the socio-RBT service information includes the RBT subscription information which facilitates display of RBT related information of the user 230. In an embodiment of the present invention, the RBT subscription information may include, but is not limited to, name, location, MSISDN of the RBT subscriber and RBT Identifications (IDs) of one or more RBTs subscribed by the RBT subscriber. Each RBT is associated with an RBT ID which is a unique identifier of the RBT. Further, the RBT subscription information may include RBT statistics information. The RBT statistics information may include, but is not limited to, number of RBT subscribers who have selected the RBT, rating of the RBT, number of times the RBT has been copied from other RBT subscribers etc.

RBT social plug-in module 220 is an entity which enables to and fro channelization of the socio-RBT service information in adherence to security policies of the TSP between the telecommunication network 232 and the social network 234. In various embodiments of the present invention, the RBT social plug-in module 220 is a gateway that facilitates transmission of the socio-RBT service information to the local database 212 from the RBT subscriber database 218 periodically via the internet 228 and the RBT module 210 respectively based on the socio-RBT subscription information received from the social network module 206 via the same channel. In an embodiment of the present invention, the RBT social plug-in module 220 transmits the socio-RBT service information to the local database 212 from the RBT subscriber database 218 via the internet 228 and the RBT module 210, respectively, in real-time. In another embodiment of the present invention, the RBT social plug-in module 220 transmits the socio-RBT service information to the local database 212 from the RBT subscriber database 218 via the RBT social plug-in 220, the internet 228 and the RBT module 210, respectively, at regular intervals of time. For example, the local database 212 may be updated in every 1 hour or 6 hours or twice a day or once a day.

In an embodiment of the present invention, the RBT social plug-in module 220 is connected to the Internet 228 by an Internet Protocol (IP) based interface. An example of such an IP based interface is Hyper Text Transfer Protocol (HTTP). In an embodiment of the present invention, the RBT social plug-in module 220 has access to the socio-RBT service information stored in the RBT subscriber database 218. However, the RBT social plug-in module 220 has limited access to the socio-RBT service information stored in the RBT subscriber database 218 in accordance to the security policies of the TSP.

In another embodiment of the present invention, the RBT social plug-in module 220 comprises a layer of RBT Internet API, wherein the RBT Internet API is a set of APIs for interfacing with the social network 234. The RBT Internet API 234 retrieves socio-RBT subscription information from the social network 234. In yet another embodiment of the present invention, the RBT Internet API transmits socio-RBT service information to the social network 234. In an embodiment of the present invention, the RBT social plug-in module 220 communicates with the RBT provisioning module 222 to facilitate transmission of socio-subscription information from the RBT system 216 to the social network 234.

RBT provisioning module 222 is an entity which facilitates provisioning of one or more modules of the RBT system 216. In various embodiments of the present invention, the RBT provisioning module 222 may be a set of APIs wherein the APIs may perform various functions such as billing related to the socio-RBT service, provisioning RBT subscriber database 218 and network based provisioning etc. In various embodiments of the present invention, the RBT provisioning module 222 receives the socio-RBT subscription information from the user 230 for accessing the socio-RBT service. The request may be received by the RBT provisioning module 222 through a plurality of interfaces used by the user 230, including, but not limited to, Short Message Service (SMS), Interactive Voice Response (IVR), filling form on Internet, Wireless Access Protocol (WAP), Unstructured Supplementary Service Data (USSD) etc. The socio-RBT subscription information may include input on various user attributes and preferences. The user attributes may include, but are not limited to, country, social networking website to which the user is registered with, the user's 230 profile Identification (ID) for accessing the social networking website, the socio-RBT service the user 230 has subscribed etc. For example, the user may call a voice portal where he may interact with the IVR to input the user attributes and preferences. The RBT provisioning module 222, then, verifies predetermined conditions, for example, verifying if the user 230 is eligible to access the socio-RBT service by checking if there is collaboration between the Telecommunication Service Provider (TSP) of the user, Value Added Service (VAS) provider of the socio-RBT service and VAS provider of RBT service. The RBT provisioning module 222, then, transmits the user attributes and preferences to the user interface 204 via a RBT social plug-in module 220 in the RBT system 216, the interne 228 and the RBT module 210 respectively, for subscribing the user to the requested socio-RBT service. Thereafter, the user interface 204 subscribes the user to the requested socio-RBT service for subsequent installation of the socio-RBT service on the user's 230 social networking website profile. In an embodiment of the present invention, the user 230 may be notified of the subscription to the socio-RBT service.

In a further embodiment of the present invention, the RBT provisioning module 222 handles registration of the user 230 to a RBT service, that has requested for subscription to the socio-RBT service and is not subscribed to the RBT service. Further, the RBT subscription information of the user 230 subscribed to the RBT service is uploaded in the RBT subscriber database 218 by the RBT provisioning system 222.

Media-emoticons-emotions mapping module 224 is an entity that maps RBT IDs of one or more RBTs to the appropriate emoticons and/or emotions. The emoticon is a symbol or combination of symbols used to convey emotional state in written or message form. Emotions are a message and/or symbols used to convey emotional state in written or message form. In various embodiments of the present invention, the media-emoticons-emotions mapping unit 224 may be included in the telecommunication network 232. The media-emoticons-emotions mapping unit 224 interacts with the RBT social plug-in module 220 to obtain RBT related information stored in the RBT subscriber database 218. An RBT may be associated with the emoticon/emotions expressing the emotional state that the RBT reflects. For example, if the RBT is a song expressing a sad mood, the RBT can be associated with a "sad" emoticon/emotions. If the RBT is a song expressing a happy mood, the RBT can be associated with "happy" emoticon/emotions. In another embodiment, media-emoticons-emotions mapping unit 224 may be included in the social network 234. The emoticon/emotions based on the RBT selected by the user 230 is also stored in the RBT subscriber database 218 as part of the socio-RBT subscription information.

Multi VAS module 226 is a database that comprises the socio-RBT service information of the user 230. In various embodiments of the present invention, the multi VAS module 226 and socio-RBT application module 202 communicate with each other to exchange the RBT information through an interface (not shown) residing in both the modules. In an embodiment of the present invention, exchange of the RBT information between the multi VAS module 226 and the socio-RBT application module 202 takes place similar to the way the RBT module 210 and the RBT social plug-in module 220 exchanges the RBT information with each other.

In an embodiment of the present invention, a VAS provider provides the RBT service to a RBT subscriber in collaboration with the TSP. It may be possible that the VAS provider providing the socio-RBT service is different from the VAS provider providing the RBT service to the user 230. In such a scenario, the multi VAS module 226 acts as an interface between the VAS provider providing socio-RBT service and VAS provider providing RBT service and may be used to retrieve the socio-RBT service information for providing the socio-RBT service. In an embodiment of the present invention, the multi VAS module 226 may be used by a VAS provider that provides the socio-RBT service using the socio-RBT system 200. In an embodiment of the present invention, the multi VAS module 226 provides a plurality of APIs to enable the RBT social plug-in module 220 to retrieve the RBT subscription information therefrom and facilitate the RBT social plug-in module 220 to transmit the RBT subscription information from the multi VAS module 226 to the social network module 206 via the internet 228 and the RBT module 210, respectively.

Figure 3:
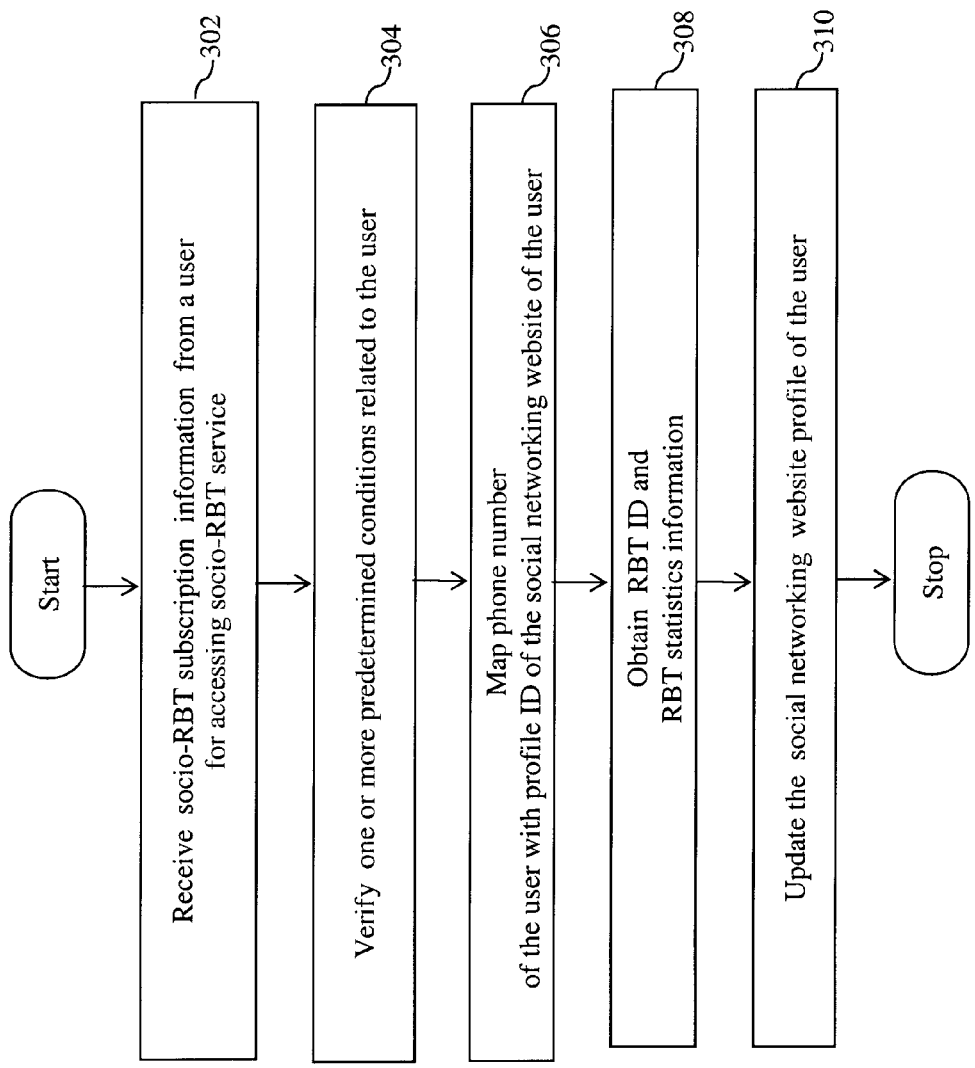
FIG. 3 is a flowchart illustrating a method for updating social networking website profile of a user with RBT related data/information of a user in accordance with an embodiment of the present invention.

FIG. 3 is a flowchart illustrating a method for updating social networking website profile of a user with RBT related information of a user in accordance with an embodiment of the present invention.

At step 302 socio-RBT subscription information is received from a user. In various embodiments of the present invention, the socio-RBT subscription information includes a unique identifier of the user. In an embodiment of the present invention, the unique identifier may be a Mobile Station International Subscriber Directory Number (MSISDN). The MSISDN may be provided by the user along with various other attributes, such as, but not limited to, name, location, email-id of the user as well as various user preferences. In another embodiment of the present invention, the unique identifier may be an International Mobile Subscriber Identity (EMSI) number of the user.

At step 304, one or more predetermined conditions related to the user are verified. In various embodiments of the present invention, the verification is performed to determine if the user is registered with a Value Added Service (VAS) provider of the socio-RBT service and if the user is also a RBT subscriber. In various embodiments of the present invention, after the user makes request for subscription to the socio-RBT service, one or more predetermined conditions are verified for subscription of the user to the socio-RBT service. The one or more predetermined conditions may facilitate to determine if the user is eligible to be subscribed to the socio-RBT service. In an example, the eligibility is determined by identifying the provider of the socio-RBT service to the user, authenticity of the user, RBT service'subscription of the user etc.

In an embodiment of the present invention, verification of the eligibility of the user for subscription to the socio-RBT service involves determination of a Telecommunication Service Provider (TSP) the user is registered with using the user attributes provided by the user such as country, MSISDN etc.

In an embodiment of the present invention, in case it is determined that the TSP, the user is registered with has collaboration with a VAS provider of the socio-RBT service, then the user is verified as being eligible to subscribe to the socio-RBT service. In another embodiment of the present invention, in case it is determined that the TSP, the user is registered with has no collaboration with the VAS provider of the socio-RBT service, then it is verified whether a multi VAS module in the RBT system has the socio-RBT service information of the user. The user is verified to be eligible to subscribe to the socio-RBT service only if the multi VAS module has the socio-RBT service information of the user.

In another embodiment of the present invention, in case it is determined that the TSP, the user is registered with has no collaboration with the VAS provider of the socio-RBT service, and the multi VAS module does not have the socio-RBT service information of the user, then the user is not eligible for being subscribed to the socio-RBT service. In an embodiment of the present invention, the user can be notified that the socio-RBT service cannot be provided to him.

In yet another embodiment of the present invention, the verification of authenticity of the user may involve an authentication message to be sent to the user. The authentication message includes details of one or more of the socio-RBT service requested by the user and a request to reply to the authentication message. For example, the user may receive an SMS on the MSISDN provided by the user. The SMS may inform the user about the particular socio-RBT service the user has requested to subscribe. In a further embodiment of the present invention, the user is requested to reply to the SMS to confirm the request for subscription to the socio-RBT service. In an example, the SMS may include password that the user needs to enter on his social networking website profile for accessing the socio-RBT service.

For example, in case the user requests for subscription to the socio-RBT service by calling a voice portal, the user may be required to input the password received in the social networking website profile of the user as the authentication message. In another embodiment of the present invention, the user may authenticate himself via a user interface. In yet another embodiment of the present invention, the user may authenticate himself by sending a password received via SMS to a RBT provisioning module.

In another embodiment of the present invention, a check is performed to determine if the user is a RBT subscriber. In an embodiment of the present invention, the check is performed by verifying the RBT subscription information of the user from a RBT subscriber database. Using MSISDN of the user, it is checked with the RBT subscriber database whether the user is a RBT subscriber or not. In case, the user is found not to be a RBT subscriber, the user is subscribed to the RBT service.

At step 306, unique identifier of the user is mapped with unique identifier of social networking website profile of the user. In various embodiments of the present invention, the MSISDN of the user is mapped with the corresponding social networking website profile of the user.

At step 308, RBT subscription information corresponding to the mapped information is obtained. In various embodiments of the present invention, RBT Identification (ID) and RBT statistics information of the RBT subscribed by the user is obtained corresponding to the MSISDN or IMSI number of the user. In an embodiment of the present invention, TSP of the user is determined based on the MSISDN of the user. Further, RBT ID and RBT statistics information corresponding to the MSISDN of the user are extracted from the RBT subscriber database. In another embodiment of the present invention, in case the VAS provider providing the socio-RBT service is different from the VAS provider providing the RBT service to the user, a RBT social plug-in module extracts the RBT ID and the RBT statistics information from the multi VAS module, based on the request and MSISDN retrieved from the mapped information. In another embodiment of the present invention, RBT ID and the RBT statistics information may be extracted when the user logs into his social networking website profile.

At step 310, the social networking profile of the user is updated. In various embodiments of the present invention, using the RBT ID and RBT statistics information the RBT related information corresponding to the obtained RBT ID and the RBT statistics information is updated on the social networking website profile of the user. Further, the RBT related information is published on the web page of the respective social networking website profile of the user based on the preferences selected by the user. In an embodiment of the present invention, the social networking website may publish the RBT related information on the web page of the respective social networking website profile of the user based on the preferences selected by the user. For example, if the user selects an option to provide updates about his RBT, to other users tagged as 'Friends' in his social networking website, only the users/subscribers added as "Friends" by the user receives a message on their respective social networking website profiles, informing them of the RBT that the user has subscribed to and the RBT statistics information of the RBT.

In an embodiment of the present invention, emoticon corresponding to the RBT ID may be retrieved from a media-emoticons mapping unit which is updated on the social networking website profile of the user.

In various embodiments of the present invention, the user can update subscription to the socio-RBT service in case he wants to modify his subscription to the socio-RBT service. Modifying the socio-RBT service subscription may include, but without limitation, adding one or more socio-RBT service. The user may update the subscription to the socio-RBT service using a plurality of interfaces including, but not limited to, Short Message Service (SMS), Interactive Voice Response (IVR), filling form on Internet, Wireless Access Protocol (WAP), Unstructured Supplementary Service Data (USSD) etc. In an embodiment of the present invention, the social networking website can update the socio-RBT service. Further, in an embodiment of the present invention, other users of the socio-RBT service can visit the social networking website profile of the user to access and copy the RBT and/or socio-RBT-service profile as his own socio-RBT service profile. Further, the other users wanting to copy the RBT and/or socio-RBT-service profile of the user are subscribed to the socio-RBT service in case the other users are not subscribed to the socio-RBT service.

While example embodiments of the invention have been illustrated and described, it will be clear that the invention is not limited to these embodiments only. Numerous modifications, changes, variations, substitutions and equivalents will be apparent to those skilled in the art without departing from the spirit and scope of the invention.

We claim:

1. A method for providing access to a webpage update service, wherein the webpage update service enables updating a user webpage with RBT related information of the user, the method comprising the steps of:
   receiving webpage update subscription information from the user, wherein the webpage update subscription information comprises at least one unique identifier of the user and information identifying a website at which the user is registered;
   verifying one or more predetermined conditions related to the user, wherein the predetermined conditions facilitate a determination if the user is eligible to access the webpage update service;
   mapping the unique identifier of the user with a unique identifier of the user's webpage;
   obtaining RBT subscription information corresponding to the unique identifier of the user, said RBT subscription information including RBT related information; and
   modifying profile information mapped to the unique identifier of the user's webpage, by including a status descriptor for display on a network communication device accessing the user's webpage, wherein content of the displayed status descriptor is descriptive of content of the user's RBT.

2. The method of claim 1, wherein the unique identifier of the user comprises at least one of: the user's Mobile Station International Subscriber Directory Number (MSISDN) and International Mobile Subscriber Identity (IMSI) number.

3. The method of claim 1, wherein the step of verifying one or more predetermined conditions further comprises determining if the user is a RBT subscriber.

4. The method of claim 3 further comprising registering the user to a RBT service in case the user is not a RBT subscriber.

5. The method of claim 1 further comprising facilitating other users of the webpage update service to access and copy the RBT related information from the user's webpage.

6. The method of claim 5 further comprising subscribing other users to the webpage update service in case the other users are not subscribed to the webpage update service.

7. The method of claim 1, wherein the RBT subscription information comprises at least one of: a unique identifier associated with RBT selected by the user and RBT statistics information.

8. The method of claim 1, wherein RBT related information comprises at least one of: RBT selected by user and emoticon and/or emotions based on the RBT selected by the user.

9. A computer program product for providing access to a webpage update service, wherein the webpage update service enables updating a user webpage with RBT related information of the user, the computer program product comprising a non-transitory computer usable medium having a computer readable program code embodied therein, the computer program code comprising instructions for:
   receiving webpage update subscription information from the user, wherein the webpage update subscription information comprises at least one unique identifier of the user and information identifying a website at which the user is registered;
   verifying one or more predetermined conditions related to the user, wherein the predetermined conditions facilitate a determination if the user is eligible to access the webpage update service;
   mapping the unique identifier of the user with a unique identifier of the user's webpage;
   obtaining RBT subscription information corresponding to the unique identifier of the user, said RBT subscription information including RBT related information; and
   modifying profile information mapped to the unique identifier of the user's webpage, by including a status descriptor for display on a network communication device accessing the user's webpage, wherein content of the displayed status descriptor is descriptive of content of the user's RBT.

* * * * *